W. R. EVANS.
SAFETY DEVICE FOR AEROPLANES.
APPLICATION FILED MAY 28, 1918.
1,277,892.
Patented Sept. 3, 1918.
3 SHEETS—SHEET 1.
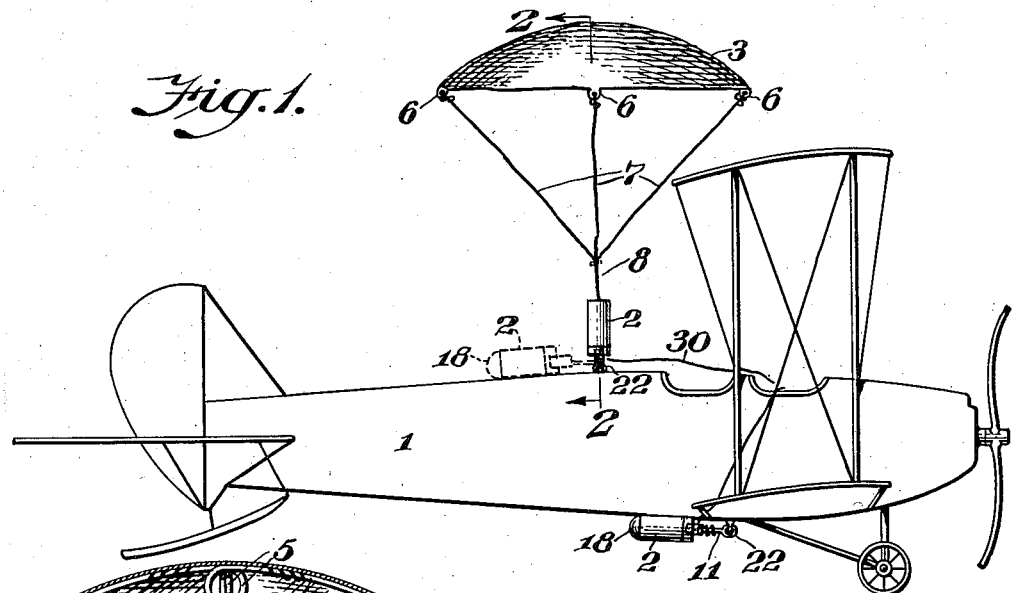
Fig. 1.
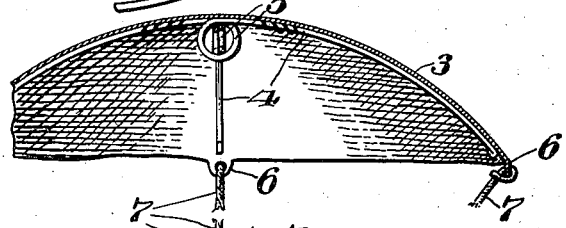
Fig. 2.
ON LINE 2-2
FIG-1
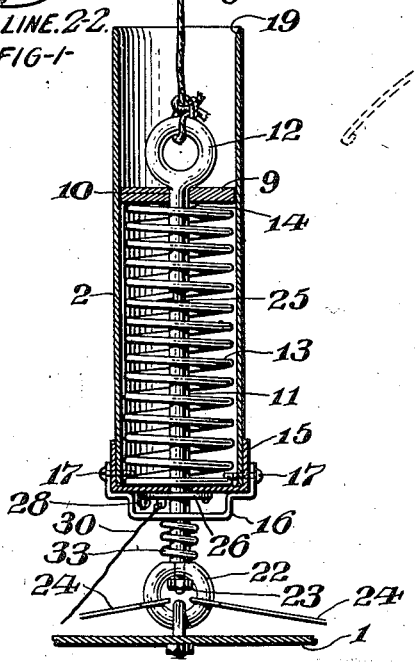
Fig. 3.
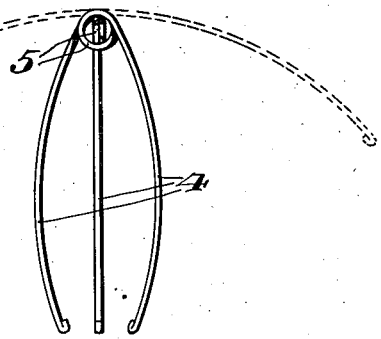
INVENTOR
William R. Evans
BY
Wiedersheim Fairbanks
ATTORNEYS W. R. EVANS.
SAFETY DEVICE FOR AEROPLANES.
APPLICATION FILED MAY 28, 1918.
1,277,892.
Patented Sept. 3, 1918.
3 SHEETS—SHEET 2.
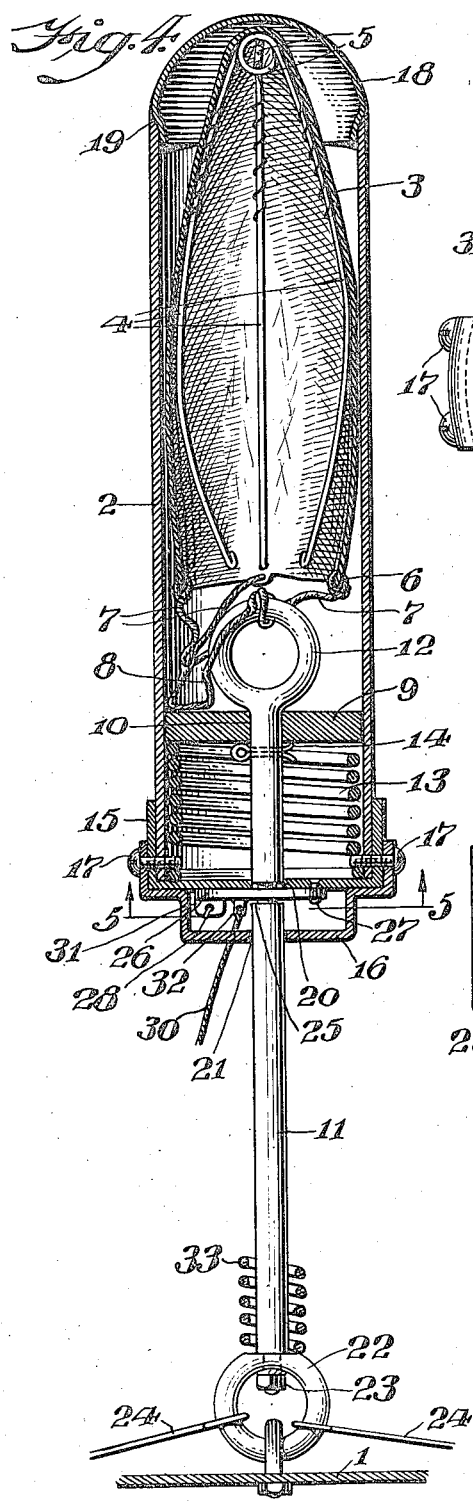
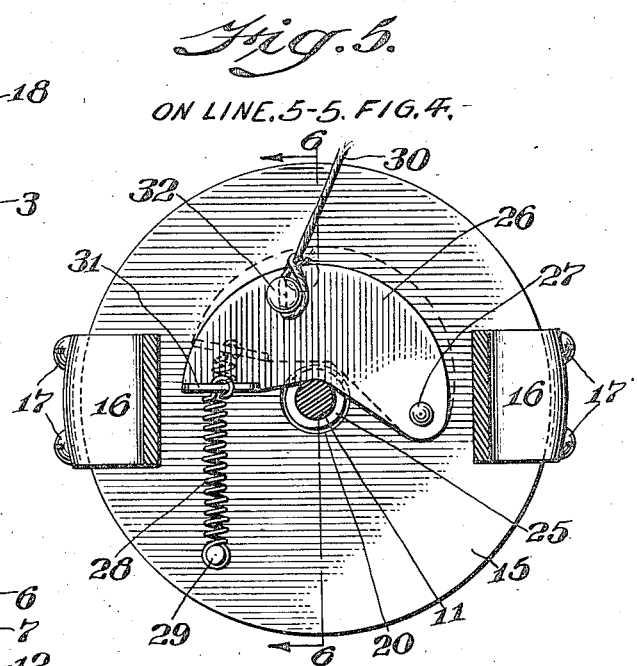
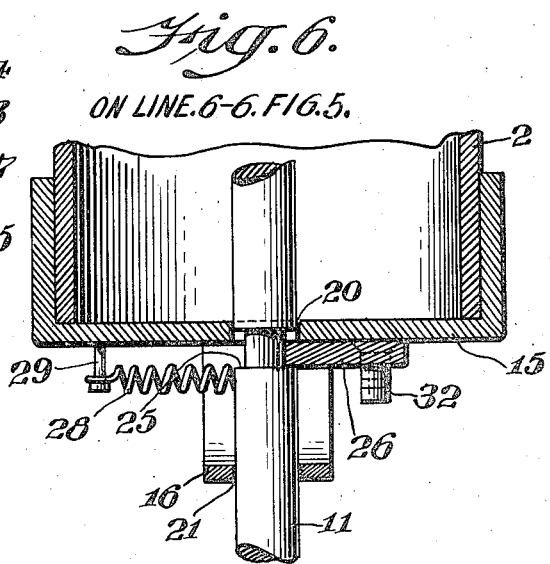
INVENTOR
William R. Evans.
BY
Niedershein Gaubault
ATTORNEYS

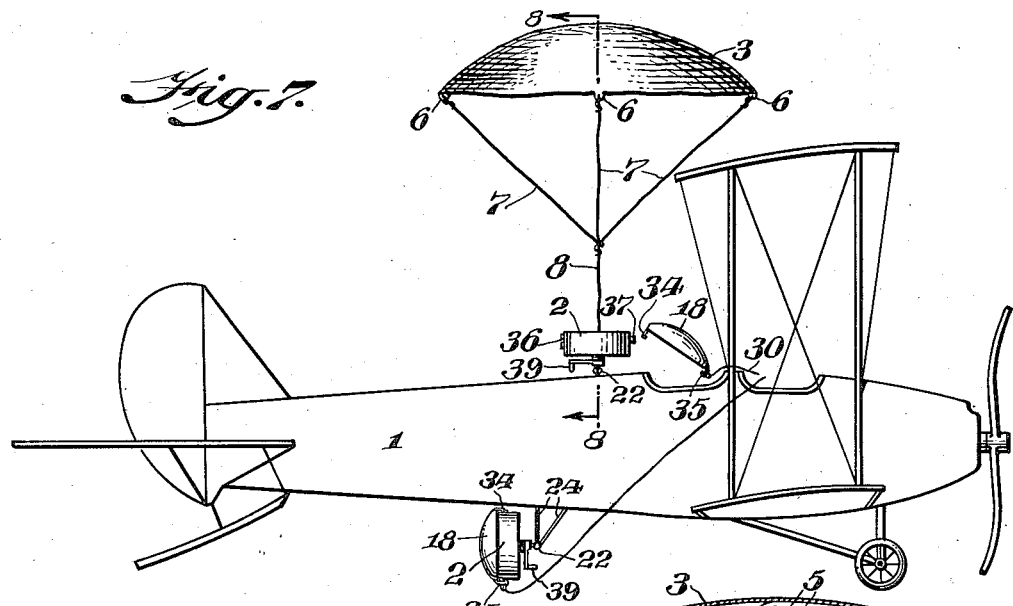
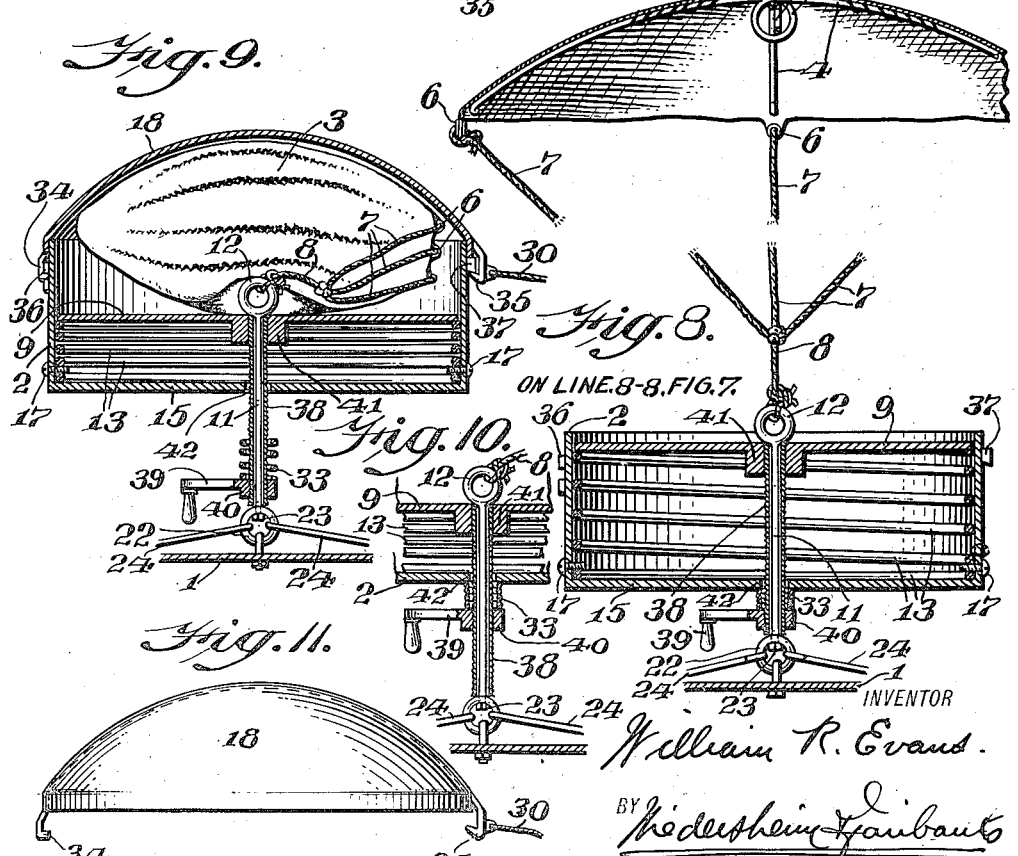

UNITED STATES PATENT OFFICE.

WILLIAM R. EVANS, OF PHILADELPHIA, PENNSYLVANIA.

SAFETY DEVICE FOR AEROPLANES.

1,277,892.  Specification of Letters Patent.  Patented Sept. 3, 1918.

Application filed May 28, 1918. Serial No. 237,008.

*To all whom it may concern:*

Be it known that I, WILLIAM R. EVANS, a citizen of the United States, residing in the city and county of Philadelphia, State of Pennsylvania, have invented a new and useful Safety Device for Aeroplanes, of which the following is a specification.

My invention relates in general to devices for rendering safe all types of heavier than air machines in which the different constructions of aeroplanes are embodied.

It may have application to lighter than air flying machines, but my particular purpose is to render safe the heavier than air machine and also the operator of it.

The object of my invention is to provide means of the parachute type for application to a flying machine, which under the control of the operator in the event of injury to the machine, will safe-guard its descent, and which will also in the event of the machine's being set on fire, enable the operator to save himself by a descent from it without regard to any effort to save the machine.

With these and kindred objects in view, my invention comprehends certain specific devices of a character typically represented in the accompanying drawings and hereinafter described, the particular subject-matter which I claim as my invention being definitely set forth in the claiming clauses.

For the purpose of illustrating my invention, I have shown in the accompanying drawings types and embodiments of it which are at present preferred by me because in practice they will be found to give satisfactory and reliable results.

It is to be understood, however, that I do not confine myself to the specific instrumentalities illustrated, because in its broader aspects my invention may be embodied in various other forms.

In the accompanying drawings—

Figure 1 represents in side elevation a typical aeroplane with a parachute attachment indicated in its operative position after it has been put into action by the operator.

Fig. 2 is a central, sectional elevation, taken on the line 2—2 of Fig. 1, of the simplest embodiment of my parachute device shown in the position of action or expulsion of the parachute.

Fig. 3 is an illustration of the parachute springs in normal compressed position, and in dotted lines in extended position.

Fig. 4 is a view similar to Fig. 3, showing all of the parts in their normal or closed position in readiness for operation at the will of the operator.

Fig. 5 is a bottom plan, sectional on the line 5—5 of Fig. 4, of the base of the cylinder represented in Fig. 4.

Fig. 6 is a fragmentary, central, vertical, sectional detail on the line 6—6 of Fig. 5, of the cylinder and certain of its adjunctive connecting and operating devices.

Fig. 7 is a side elevational view similar to Fig. 1, illustrating the application of a modification of my invention to a typical aeroplane.

Fig. 8 is a central, sectional elevation similar in general to Fig. 2, on the line 8—8 of Fig. 7, illustrating the parts in the position which they occupy when the operator has caused the release of the parachute.

Fig. 9 is a view similar to Fig. 8, indicating, however, the parts in the normal position or those which they occupy prior to the release of the parachute.

Fig. 10 is a fragmentary detail of the devices represented in Fig. 9, in another position of certain of the parts.

Fig. 11 is a side elevational view of the parachute retaining cap removed from its cylinder.

Similar numerals of reference indicate corresponding parts.

Referring to the drawings:—

1 designates an aeroplane which is typical of any flying machine to which my invention is applicable.

As these machines are well understood and of different constructions, no description of the machine shown is necessary.

My parachute attachment, of which I contemplate applying to a flying machine either one or any desired plurality of them, is under the control of the pilot or other person within the machine, and in its simplest embodiment comprises a cylinder 2 of light metal, preferably as shown in the first six figures, of small diameter and considerable length, within which is adapted to be contained the parachute 3 when closed and compressed.

The parachute which may itself be of any usual form, is provided with a plurality of compressible and preferably curved springs 4, conveniently made of bent spring wire of the form particularly shown in Figs. 3 and 4, that is to say, with a turned over bend 5, which by reason of its form is the spring proper of the spring arms 4, and which by its resilience permits the arms when released to expand into the form particularly shown in Figs. 2, 3 and 8. The number and expanding power of these springs is optional with the constructor, but it is essential that they should possess the qualities of compressibility and expansibility.

By any desired connection the bent portions or bends 5 of these springs are connected centrally with the parachute 3, which is formed of any desired material and provided with eyes 6, to which a plurality of cords 7 are connected and brought together to a point where they are connected as a depending parachute cord 8, which is itself adapted to be connected with an operative mechanism of the following construction:—

Within the cylinder 2 is fitted a disk-like spring-compressing piston 9 adapted to have longitudinal movement within the cylinder, and through an axial opening 10 in which is adapted to pass a connecting rod 11, which above the piston is conveniently formed with a head 12 in the form of a ring to which the parachute cord 8 is connected. A cotter pin 14, or similar stop, passes through the rod 11 beneath the piston to insure the connection of the rod with the piston and prevent possible undue expulsion of the head with relation to the piston and cylinder.

Beneath the piston, within and near the base of the cylinder is contained a coiled expelling spring 13, which in the normal or locked position of the parts is compressed as in Fig. 4, and in the open or operative position of the parts is expanded as in Fig. 2.

The base of the cylinder is conveniently inclosed by a base cap 15, beneath which is a bent strap latch housing 16, both of which are fastened by screws 17 arranged radially and extending sufficiently far within the walls of the cylinder to pass within the lower coil of the coiled spring 13 and fasten it to the base of the cylinder by holding it down against the cap 15.

A tightly fitting cover cap 18, preferably hemispherical, fits tightly within the upper open end of the casing, which in this form of my construction may be slightly reamed as at 19 to effect a snug fit.

The connecting rod 11 passes downwardly through a central aperture 20 in the base cap 15 and a central aperture 21 in the latch housing 16, its length being about equal to that of the cylinder, and at its lower end it is conveniently provided with a rod ring 22, preferably secured to it by a nut 23 to which are linked stay rods 24 connected with the aeroplane.

At a point preferably about a third of its length and near its upper portion, the connecting rod 11 is formed with a channel 25, or kindred circumferential groove, within which is adapted to be swung and engage a pivoted latch or trigger 26 contained within the latch housing 16. The pivot of this latch is 27, and its form may be that of a crescent, as shown in Fig. 5, or it may be simply a straight flat bar controlled at its outer end or that beyond the pivot by connection through, for instance, a flanged plate 31 with a retaining spring 28, the outer end of which is secured to a pin 29 on the base cap 15.

To or near the free end of this latch is connected by a perforated lug 32, or other device of attachment, an operating cord 30 which passes to the pilot, observer, or other person in the aeroplane. By traction upon this cord the latch normally in the position shown in full lines in Fig. 5 and in engagement with the channel 25 in the connecting rod 11, will be drawn away from said channel so as to free the connecting rod for vertical movement within the cylinder under the expansion of the released expelling spring.

Assuming the normal position of the parachute device as an entirety to be that shown in Figs. 4, 5 and 6, it will be apparent that when the connecting rod 11 has been pulled down relatively to the cylinder, pulling down with it the piston 9, and through said piston compressing the expelling spring 13, the engagement of the spring-controlled latch with channel 25 of the rod, will hold the rod down and in the position particularly illustrated in Fig. 4.

In this position, of course, the parachute is assumed to have been entered and compressed within the cylinder and the cylinder cap to have been put in place. When, then, the operating cord is pulled so as to swing the latch into the position shown in dotted lines in said Fig. 5, the connecting rod will have been released from latch control and the expelling spring 13 set free to expand and, in so doing, to drive up the piston 9, and through it expel the parachute from the piston, the cover cap being thrown off.

The result of this action will be to throw all of the parts into the position shown in Fig. 2,—a buffer spring 33 on the connecting rod having overcome the shock of the expulsive force of the expelling spring 13 by acting against the rod ring 22 and the stay rods 24 or other connections with the aeroplane.

In Figs. 7 to 11 inclusive, I have illustrated a modification of my invention in which the dimensions of the cylinder are different from those shown in Figs. 1, 2, 4, 5 and 6, in that the cylinder is of greater diameter and less length, and in that, moreover, the latching device for controlling the action of the expelling spring is applied to the cover cap 18 of the cylinder instead of directly to the connecting rod 11.

In this construction, the cover cap 18 is connected with the upper end of the cylinder by a lug 34 of hook-like form, adapted to engage with a rib 36 on the cylinder, while diametrically opposite to this hook connection the latch 35 is preferably of spring form and adapted to be engaged beneath a latch lug 37 on the cylinder. To the latch 35 the operating cord 30 is attached, and in the normal position shown in Fig. 9, the cover cap is fastened and the parachute confined within it and resting upon the piston 9 horizontally instead of vertically as in the construction of Figs. 1 to 6 inclusive.

In this modification, the connecting rod 11 passes through the bore of an externally threaded sleeve 38, which extends downwardly from the piston with which it is integrally connected by a boss 41, to below the base cap 15 through an aperture 42 therein, from which it passes to a length nearly the same as the length of the connecting rod 11.

Upon the threaded exterior of this sleeve is mounted a threaded nut 40, formed or provided with an outwardly extending handle 39, and upon the sleeve is mounted the buffer spring 33.

In the use of this modified construction, assuming, for explanation, the parts to be in the position represented in Fig. 8, with the piston 9 in its upper position and the expelling spring expanded, as is the position assumed by these parts when the parachute has been set free,—the next step in preparing the device for action, is to draw down the piston 9 and compress the expelling spring 13, and this is accomplished by rotating the handle 39 and its nut 40 upwardly upon the sleeve from the position represented in Fig. 9 to that represented in Fig. 10, with the result that the upper portion of the space within the cylinder is made vacant to receive the parachute which when laid flat therein is held down and in place by closing the cover cap 18.

This having been accomplished, the handle and its nut are rotated backwardly into the position shown in Fig. 9, in which position, when the operating cord 30 is drawn to release the latch 35, the parachute will be released from the hold of the cap and the piston beneath it likewise released, with the result that the expelling spring will expand from the compressed position shown in Figs. 9 and 10 into the expanded position shown in Fig. 8, the sleeve 38 and the connecting rod 11 in such action rising with the piston relatively to the cylinder until the buffer spring 33 encounters the base plate of the base cap 15, as shown in Figs. 8 and 10, and resists the further upward movement of the piston.

The distinction between this modification and the construction of the first six figures of the drawings, resides in the inconsequently differing proportioning of the dimensions of the cylinder and in the transference of the latch from being directly operative upon the connecting rod 11, to an application to the cap and cylinder to retain the cap closed.

While this modification is one easily suggested, and therefore referred to, it is obviously not the only one to which I may resort, and I simply illustrate it as a type of an obvious modification.

The means for connection and disconnection of the parachute-containing cylinders with the aeroplane, and the number of them which may be employed, are immaterial,—it being within my contemplation to dispose or locate any desired number of them with respect to the body of the machine in such local disposition and by such desired means of connection, as will enable a person within the machine through the operating cords which extend to within his reach, to instantly act upon them so as to occasion the release of the parachute, with the result that in a fall of the machine, their action will be to control against and slow up a dangerously rapid descent.

In the event of the machine taking fire, it is within the contemplation of my invention that any one of these attchments, considered as an entirety, should be located within reach of the operator so that it can be detached by him from the machine and serve when he leaps out, retaining his hold upon it, to assure his safe descent.

It will now be apparent that I have invented a new and useful safety device for aeroplanes, which embodies the features of advantage enumerated as desirable in the statement of the invention and the above description, and while I have, in the present instance, shown and described a preferred embodiment which will be found in practice to give satisfactory and reliable results, it is to be understood that the same is susceptible of modification in various particulars without departing from the spirit or scope of the invention or sacrificing any of its advantages.

Having thus described my invention, what I claim as new and desire to secure by Letter Patent, is:—

1. A parachute holder adapted for application to a flying machine and comprising in combination a self-expansible spring-controlled parachute adapted to be compressed within the holder, a holder for containing said compressed parachute, a spring-controlled piston within said holder, a coiled spring for operating upon said piston, a connecting rod connected with the piston and passing through the spring and connected at its inner end with the parachute and at its outer end with the flying machine, and a latch device under the control of the operator which operates to release the connecting rod and free the spring for action.

2. A parachute holder adapted for application to a flying machine and comprising in combination a self-expansible spring-controlled parachute adapted to be compressed within the holder, a holder for containing said compressed parachute, a spring-controlled piston within said holder, a coiled spring for operating upon said piston, a connecting rod connected with the piston and connected at its inner end with the parachute and at its outer end with the flying machine, and a spring-controlled latching device under the control of the operator which operates directly upon the connecting rod to free said rod and the coiled spring for action.

3. In combination with a flying machine, a self-expansible spring-controlled parachute, a parachute holder comprising a cylindric case, a piston fitted within said case, a spring between said piston and the base of the case, a connecting rod attached to the piston and extending through the base of the case to a connection with the flying machine, and a latching device under the control of the operator for controlling the spring-controlled piston.

In testimony whereof I have hereunto signed my name this twenty-fifth day of May, 1918.

WILLIAM R. EVANS.

In the presence of—
I. BONSALL TAYLOR,
H. G. DIETERICH.